US007822985B2

(12) United States Patent
Anstey et al.

(10) Patent No.: US 7,822,985 B2
(45) Date of Patent: Oct. 26, 2010

(54) REAL-TIME ELECTRONIC SIGNATURE VALIDATION SYSTEMS AND METHODS

(75) Inventors: Timothy W. Anstey, Seattle, WA (US); David L. Allen, Kent, WA (US); Steven J. Yukawa, Seattle, WA (US); Rajit Jain, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 1079 days.

(21) Appl. No.: 11/507,147

(22) Filed: Aug. 21, 2006

(65) Prior Publication Data
US 2008/0052517 A1 Feb. 28, 2008

(51) Int. Cl.
*H04L 9/32* (2006.01)
(52) U.S. Cl. .................................. 713/176; 713/175
(58) Field of Classification Search .................. 713/176, 713/180, 181, 175
See application file for complete search history.

(56) References Cited

U.S. PATENT DOCUMENTS

| 6,253,206 | B1 * | 6/2001 | Burton et al. ............ 707/103 R |
| 6,377,810 | B1 * | 4/2002 | Geiger et al. ............. 455/456.2 |
| 6,810,259 | B1 * | 10/2004 | Zhang .................... 455/456.5 |
| 2002/0187774 | A1 * | 12/2002 | Ritter et al. ................. 455/414 |
| 2004/0057279 | A1 * | 3/2004 | Clark et al. .................. 365/164 |
| 2004/0196978 | A1 * | 10/2004 | Godfrey et al. .............. 380/270 |
| 2005/0138361 | A1 * | 6/2005 | Saarepera et al. ............ 713/156 |
| 2006/0136519 | A1 | 6/2006 | Batta et al. |
| 2006/0184591 | A1 | 8/2006 | Backholm et al. |
| 2007/0239748 | A1 * | 10/2007 | Smith ......................... 707/101 |
| 2008/0046962 | A1 * | 2/2008 | Yukawa et al. ................. 726/1 |

FOREIGN PATENT DOCUMENTS

WO    WO 01/55851 A1    8/2001

OTHER PUBLICATIONS

"An XML Digital Signature for Internet e-business Applications", Woo-Yong Han, et al., 0-7803-7010-4/01, 2001, IEEE.
"A Streaming Validation Model for SOAP Digital Signature", Wei Lu, et al., 0-7803-9037-7/05, 2005, IEEE.

* cited by examiner

*Primary Examiner*—Michael Pyzocha
*Assistant Examiner*—Jing Sims
(74) *Attorney, Agent, or Firm*—Harness, Dickey & Pierce, P.L.C.

(57) ABSTRACT

A method for real-time validation of an electronically signature generated onboard a mobile system. The method includes maintaining a ground mobile user account management (GMUAM) module user database to have up-to-date authorized user account information. The GMUAM is hosted by a stationary central computer system (CCS). The method additionally includes transferring the up-to-date authorized user account information stored on the GMUAM user database to a mobile user account management (MUAM) module user database, thereby updating the MUAM user data base with up-to-date authorized user account information. The MUAM module is included in an onboard computer system (OCS) hosted by the mobile system. The method further includes evoking a signature validator module communicatively connected to the MUAM module to access the MUAM database and verify whether user account information included in an electronic signature initiated by a secure data application (SDA) is authorized user account information. The SDA and the signature validator module hosted by the OCS.

20 Claims, 2 Drawing Sheets

REAL-TIME ELECTRONIC SIGNATURE VALIDATION SYSTEMS AND METHODS

BACKGROUND

The present disclosure relates generally to systems and methods for real-time validation of electronic signatures over communication links, e.g., synchronous or asynchronous communication links.

Today, many commercial transportation industries are continuously looking for ways to increase operating efficiencies. One result is that traditional paper intensive processes are candidates for partial or complete replacement by software solutions. Accordingly, many commercial transportation industries are implementing information technology solutions to communicate information and data between mobile platforms and remote ground based stations to improve operational efficiency. These types of communication systems often involve transmission of data and information that requires verification that the communications received are from a trusted source. Thus, the transmission of the data and information, i.e., records, must be electronically signed by the sender, i.e., the author of the data and information transmitted. However, communication links between a mobile platform, e.g., aircraft, train, bus, ship, PDA, laptop computer etc., and a remote ground based communication center or station are often established and maintained on a temporally limited and sporadic basis. That is, the mobile platforms are not typically in constant communication, or constantly connected, with the remote communications stations. Accordingly, such communication links and the transmissions of data over the links are typically asynchronous. Specifically, bi-directional communication between a mobile platform and a remote communication station may have significant delays, e.g., minutes, hours, or more, between one entity sending a message, e.g. data packages, and the receiving entity receiving the message.

Furthermore, such commercial transportation industries must often satisfy regulatory requirements with regard to signing information transmitted by personnel onboard the mobile platforms and at the remote communication stations. To satisfy such regulatory requirements, personal digital certificates are commonly issued for each user. However, the temporal delays inherent in transmissions using the typical asynchronous communications that are common between the mobile platform and remote communication station are not conducive to using personal digital certificates to verify the trustworthiness of such communications. Furthermore, use of digital certificates would require issuing, constant updating and the storing of digital certificate credentials, at both the mobile platform and remote communication station, for all personnel who are authorized to sign such communications. Such requirements are onerous and can cause delays in timely operation of the mobile platform.

However, the desire, need or regulator requirement can arise stipulating that signatures for certain functions be validated in real-time with respect to the actual electronic signing of data, information or function. That is, it can be desired, needed or required that electronic signatures be approximately instantaneously validated, i.e., in a non-temporally delayed fashion, upon the completion of electronically signing the data, information or function. This introduces an operational issue for the commercial transportation industries as it requires that the respective business enterprise keep an up-to-date database of signatures, and potentially digital certificates, for each person authorized to electronically sign such data, information or functions. The rate-of-change in user information, e.g., personnel turnover and changing passwords, and the asynchronously connected nature of the communication links are factors that complicate this operating requirement.

BRIEF SUMMARY

In various embodiments, a method for real-time validation of an electronically signature generated onboard a mobile system is provided. The method includes maintaining a ground mobile user account management (GMUAM) module user database to have up-to-date authorized user account information. The GMUAM is hosted by a stationary central computer system (CCS). The method additionally includes transferring the up-to-date authorized user account information stored on the GMUAM user database to a mobile user account management (MUAM) module user database, thereby updating the MUAM user data base with up-to-date authorized user account information. The MUAM module is included in an onboard computer system (OCS) hosted by the mobile system. The method further includes evoking a signature validator module communicatively connected to the MUAM module to access the MUAM database and verify whether user account information included in an electronic signature initiated by a secure data application (SDA) is authorized user account information. The SDA and the signature validator module hosted by the OCS.

Further areas of applicability of the present disclosure will become apparent from the detailed description provided hereinafter. It should be understood that the detailed description and specific examples, while indicating various embodiments of the present disclosure, are intended for purposes of illustration only and are not intended to limit the scope of the present disclosure. Additionally, the features, functions, and advantages of the present disclosure can be achieved independently in various embodiments of the present disclosures or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description is merely exemplary in nature and is in no way intended to limit the present disclosure, its application or uses. Additionally, the advantages provided by the various embodiments, as described below, are exemplary in nature and not all embodiments provide the same advantages or the same degree of advantages.

Figure 1:
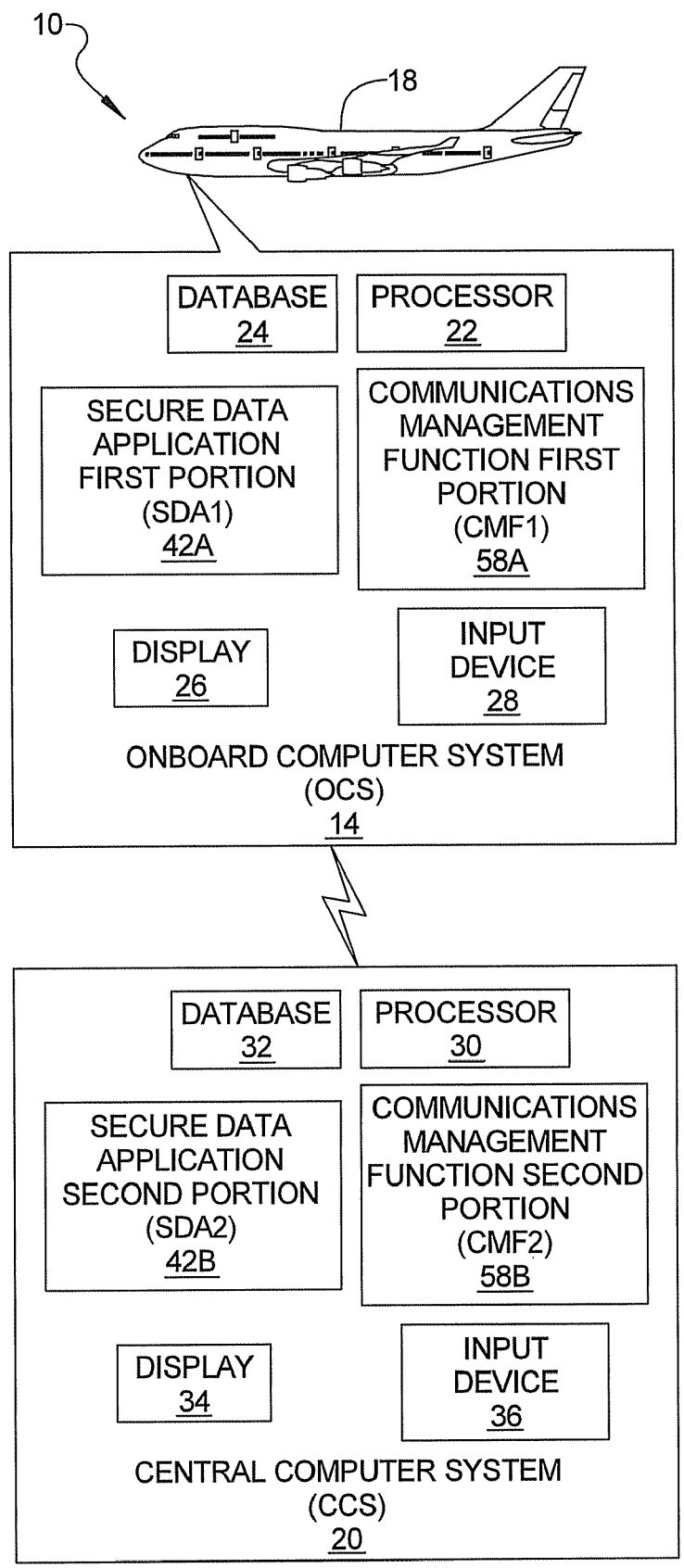
FIG. 1 is a block diagram of a real-time electronic signature validation (RTESV) system, in accordance with various embodiments of the present disclosure.

Referring to FIG. 1, a real-time electronic signature validation (RTESV) system 10 is provided, in accordance with various embodiments of the present disclosure. The RTESV system 10 can be utilized by any business enterprise, or business entity, desirous of electronically signing and validating information and/or data communicated between two or more computer based systems. As used herein, the term 'business enterprise' is defined to mean any private, commercial or industrial unit of economic organization or activity, including one or more persons, parties, groups, associates, affiliates, contractors and/or employees. The RTESV system 10 includes at least one onboard computer system (OCS) 14 hosted by at least one mobile system 18 and at least one stationary central computer system (CCS) 20 located remotely from the OCS 14 and configured to communicate with the OCS 14. In various embodiments the communication between the OCS 14 and the CCS 20 occur via asynchronous communication links, while in various other embodiments, the communication occurs via substantially constant communication links, i.e., synchronous communication links. Communications between the OCS 14 and the CCS 20 can be established using any suitable wired or wireless communications link, protocol or service. For example, in various embodiments a wireless connection is established between the OCS 14 and the CCS 20 using GPRS (General Packet Radio Service), VHF, wireless IEEE 802.11 communication and/or satellite networks that implement either Internet or ACARS$^{SM}$ (Airplane Communications and Recording System) protocols.

The mobile system(s) 18 can be any mobile or portable system(s) or platform(s) from which it is desirable to send secure information to the CCS 20. For example, the mobile system(s) 18 can be one or more portable computers (e.g., laptop computers), personal data assistants, cell phones or mobile platforms such as aircraft, trains, buses, ships or automobiles. Accordingly, although the mobile system(s) 18 is exemplarily illustrated in FIG. 1 and described herein as a single mobile platform 18, e.g., an aircraft, the scope of the present disclosure is not so limited.

The OCS 14 can be a stand alone system or a subsystem of any other computer based system and/or network component hosted by the mobile platform 18. Alternatively, the OCS 14 can comprise a combination of various subsystems and/or components of one or more other computer based systems and/or network components hosted by the mobile platform 18. For example, in various embodiments the OCS 14 is a transferable electronic, computer based system utilized by an operator of the mobile platform 18 to enhance ease and efficiency of many tasks the operator must perform during operation of the mobile platform 18. An exemplary transferable electronic, computer based system utilized by some airlines is sometimes referred to as an electronic flight bag (EFB). Alternatively, the OCS 14 can be a subsystem of an onboard local area network (LAN) or any other onboard mobile platform control system.

Generally, the OCS 14 includes at least one processor 22, at least one database 24, a display 26 and input device 28. The processor(s) 22 is/are operable for executing all functions of the OCS 14. Particularly, the OCS processor(s) 22 executes various software applications, algorithms, functions, and/or modules stored on one or more OCS electronic storage devices (not shown) and utilized or implemented during operation of the RTESV system 10, as described herein. The OCS electronic storage device(s) can be any computer readable media suitable for electronically storing the software applications, functions, algorithms and/or modules executed by the OCS processor(s) 22. For example, the OCS electronic storage device(s) can be a hard drive, a Zip drive, a CDRW drive, a thumb drive or any other electronic storage media. The OCS database(s) 24 can be any electronic memory device (s), i.e. computer readable media, for storing large quantities of data organized to be accessed and utilized during various operations of the RTESV system 10. For example, the OCS database(s) 24 can have stored thereon a plurality of look-up tables, operational and maintenance data, operational and maintenance procedures and report forms for access and use by the RTESV system 10.

The display 26 is utilized for illustrating graphical and textual data, forms and other information, and the input device 28 can be any suitable device for inputting data and information to the OCS, such as a keyboard, mouse, stylus, touch screen or joy stick. It should be understood that the OCS processor, database, display and input device 22, 24, 26 and 28 can be components of a stand alone computer based system or components of one or more other onboard systems, such as an onboard LAN or an onboard mobile platform control system, that collectively comprise the OCS 14. Alternatively, the OCS 14 can be a stand alone system that is connectable to another onboard system, e.g. an onboard LAN, such that various ones of the OCS processor, database display and input device 22, 24, 26 and 28 are included in the stand alone OCS 14 and others are included in the other system. Additionally, it should be understood that the various software applications, functions, algorithms and/or modules executed by the processor(s) 22 during operation of the RTESV system 10 can be stored on one or more OCS electronic storage devices included in a single onboard device, or in one or more onboard devices.

The OCS 20 can be any stationary computer-based system or combination of networked infrastructures located remotely from the OCS 14. For example, the CCS 20 can be a stand alone computer based system or an aggregated system comprising various systems, components and modules from a plurality of networked computer based systems. Generally, the CCS 20 includes at least one processor 30, at least one database 32, at least one display 34, and at least one input device 36. The CCS display(s) 34 can be any display(s) suitable for visually presenting graphics, text and data to a user of the RTESV system 10. The CCS input device(s) 36 can be any device(s) adapted to input data and/or information into CCS 20, for example a keyboard, a mouse, a joystick, a stylus, a scanner, a video device and/or an audio device.

The CCS database(s) 32 can be any electronic memory device(s), i.e. computer readable media, for stoning large quantities of data organized to be accessed and utilized during various operation of the RTESV system 10. For example, the CCS database(s) 32 can have stored thereon a plurality of look-up tables, operational and maintenance data, operational and maintenance procedures and report forms for access and use by the RTESV system 10. The CCS processor(s) 30 is/are operable for executing all functions of the CCS 20. Particularly the CCS processor(s) 30 executes various software applications, functions, algorithms and/or modules stored on one or more CCS electronic storage devices (not shown) and utilized or implemented during operation of the RTESV system 10, as described herein. The CCS electronic storage device(s) can be any computer readable media suitable for electronically storing the software applications, functions, algorithms and/or modules executable by the CCS processor 30. For example, the CCS electronic storage device(s) can be a hard drive, a Zip drive, a CDRW drive, a thumb drive or any other electronic storage device.

Figure 2:
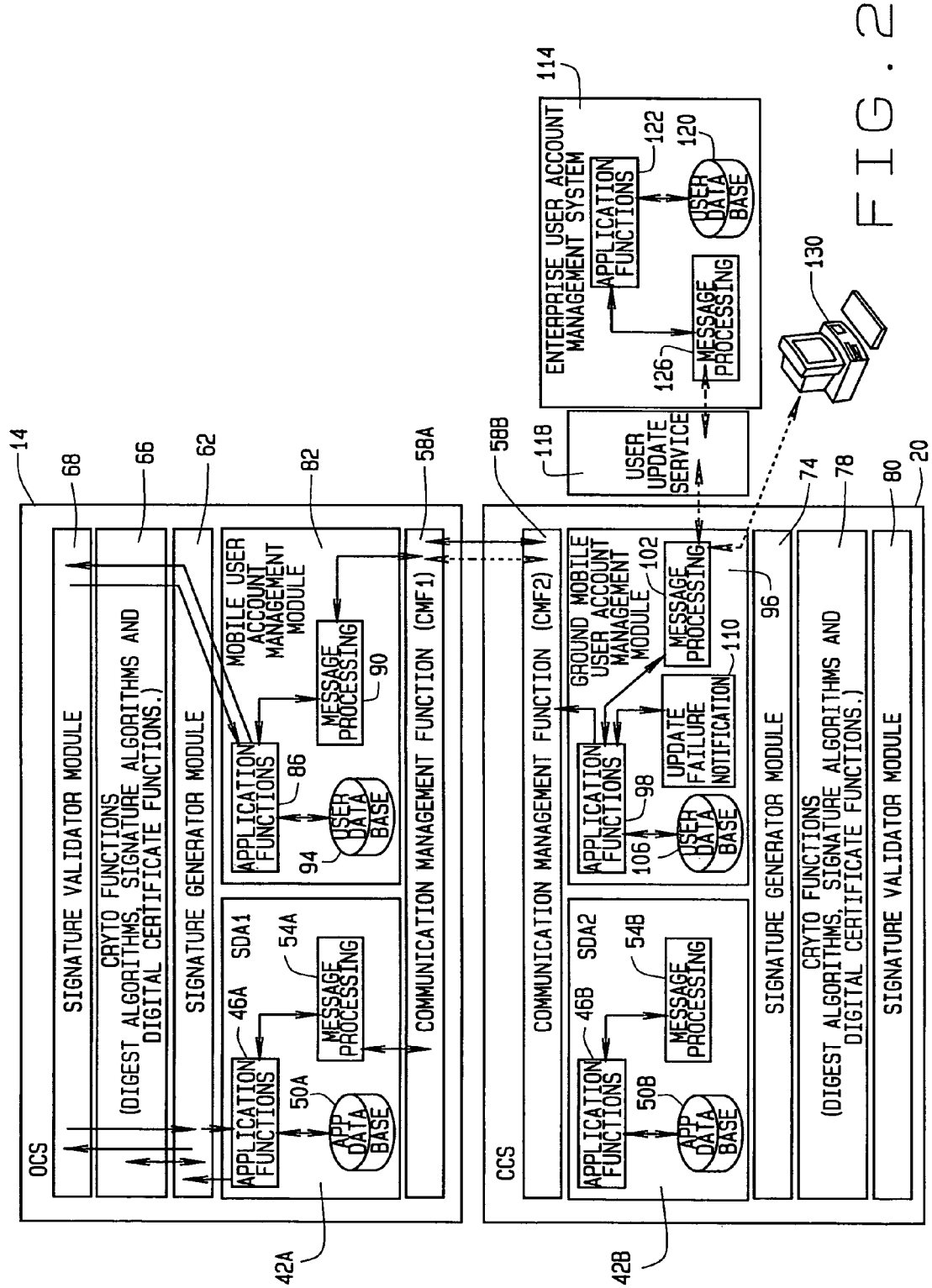
FIG. 2 is a block diagram illustrating the RTESV system shown in FIG. 1 in greater detail, in accordance with various embodiments.

Referring now to FIGS. 1 and 2, as described above, the OCS and CCS processor(s) 22 and 30 execute various software applications, functions, algorithms and/or modules stored on one or more OCS and CCS electronic storage devices (not shown). More specifically, the various software applications, algorithms and/or modules are executed by the respective processors 22 and 30 to implement operation of the RTESV system 10. It should be noted that the various software applications, functions, algorithms and/or modules will sometimes be referred to herein as 'components' of the OCS 14 and CCS 20, or of the RTESV system 10. Furthermore, although the description of the RTESV system 10 is described herein in terms of the various components, i.e., various software applications, functions, algorithms and/or modules, having a direct effect on, and direct control of the RTESV system 10, it should be understood that it is the instructions generated by the execution of various software applications, functions, algorithms and/or modules by the OCS and CCS processors 22 and 30, and the subsequent implementation of such instructions by the OCS and CCS processors 22 and 30 that have direct effect on, and direct control of the RTESV system 10.

FIG. 2 is a block diagram illustrating the various components included in the OCS 14 and the CCS 20 of the RTESV system 10 and the communication paths between the various components, in accordance with various embodiments. It should be noted that, in accordance with various embodiments, solid communication path indicators, or arrows, indicate typically synchronized communication between the respective components, however such communication could also be asynchronous and should not be so limited. Also, the dotted or dashed communication path indicators, or arrows, represent typically asynchronous communication between the respective components, however such communication could also be synchronous and should not be so limited.

in accordance with various embodiments, the OCS 14 includes a secure data application first portion (SDA1) module 42A and the CCS 20 includes a secure data application second portion (SDA2) module 42B. The SDA1 module 42A and the SDA2 module 42B are cooperating portions of a comprehensive secure data application (SDA) 42 that are hosted at separate locations within the RTESV system 10, but are cooperatively executable to perform all the functions of the SDA 42, as implemented by the RTESV system 10. Accordingly, the SDA1 module 42A and the SDA2 module 42B are comprehensively referred to herein as the secure data application (SDA) 42. The SDA 42 can be any software application evoked by a user of the RTESV system 10 to perform a specific action, operation or procedure, via the OCS 14 and/or the CCS 20, that requires the user to utilize a user specific electronic signature. For example, the SDA 42 can be an electronic logbook application utilized by a crew member onboard the mobile platform 18 to electronically enter fault reports, maintenance actions, discrepancy reports and/or travel logs to be sent to the CCS 20 that must be electronically signed by the crew member. Or, similarly, the electronic logbook application can be utilized by maintenance personnel to electronically enter maintenance reports to be sent to the mobile platform 18 that must be electronically signed by the maintenance personnel.

The SDA1 module 42A includes one or more SDA1 functions 46A that include software applications and algorithms utilized during execution of the SDA1 module 42A, and more particularly, during execution of the SDA 42. Additionally, the SDA1 module 42A includes an SDA1 database 50A that is accessible by the SDA1 functions 46A. Furthermore, the SDA1 module 42A includes a SDA1 message processing application 54A that interfaces with the SDA1 functions 46A and a communications management function first portion (CMF1) module 58A, also included in the OCS 14. The SDA1 message processing application 54A processes messages, data and information communicated between the CMF1 module 58A and the SDA1 functions 46A. Specifically, messages sent and received through the CMF1 module 58A are processed at the application-level via the SDA1 message processing application 54A. When sending a message from the SDA1 functions 46A, the SDA1 message processing application 54A generates a CMF1-compliant message. When receiving a message from another SDA1 module 42A, or the CCS 20, the SDA1 message processing application 54A extracts the data and sends it to the SDA1 functions 46A for a transaction against the SDA1 database 50A.

Generally, the SDA1 functions 46A facilitate the transfer of data among modules or components and maintain the business logic of the SDA1 module 42A. The SDA1 functions 46A interface directly with the SDA1 database 50A and the message processing application 54A. SDA1 module entries from the CCS 20 or the OCS input device 28 are not processed directly into the SDA1 database 50A. In various embodiments, each transaction must be passed through a business and data logic layer of the SDA1 functions 46A to ensure the data adheres to application business rules (e.g. required data present) and structure. However, the scope of the present disclosure should not be so limited.

The SDA1 database 50A stores all SDA1 related information and entries, including mobile platform travel information, defects, maintenance actions and deferrals, maintenance parts and tasks, service logs, information entries and maintenance releases. Additionally, in various embodiments, the SDA1 database 50A maintains a list of transactions representing all actions against the SDA1 module 42A. Also, in various embodiments, the entries in the SDA1 database 50A may not be altered or deleted, only new entries identifying the action taken are stored and related to previous entries. Additionally, the date and time the entry was electronically signed can be stored in the SDA1 database 50A.

Similarly, the SDA2 module 42B includes one or more SDA2 functions 46B that include software applications and algorithms utilized during execution of the SDA2 module 42B, and more particularly, during execution of the SDA 42. Additionally, the SDA2 module 42B includes an SDA2 application database 50B that is accessible by the SDA2 functions 46B. Furthermore, the SDA2 module 42B includes a SDA2 message processing application 54B that interfaces with the SDA2 functions 46B and a communications management function second portion (CMF2) module 58B, also included in the CCS 20. The SDA2 message processing application 54B processes messages, data and information communicated between the CMF2 module 58B and the SDA2 functions 46B. Specifically, messages sent and received through the CMF2 module 58B are processed at the application-level via the SDA2 message processing application 54B. When sending a message from the SDA2 module 42B, the SDA2 message processing application 54B generates a CMF2-compliant message. When receiving a message from another SDA2 module 42B or one or more OCSs 14, the SDA2 message processing application 54B extracts the data and sends it to the SDA2 functions 46B for a transaction against the SDA2 database 50B. Additionally, the SDA2 message processing application 54B will also send the message to a signature validator 70, as described below.

As with the SDA1 functions 46A, the SDA2 functions 46B facilitate the transfer of data among processes and maintain the business logic of the SDA2 module 42B. The SDA2 functions 46B interface directly with the SDA2 database 50 and the message processing application 54B. SDA2 entries are not processed from a message from the OCS 14 or the CCS input device 36 directly into the SDA2 database 50B. In various embodiments, each transaction must be passed through a business and data logic layer of the SDA2 functions 468 to ensure the data adheres to application business rules (e.g. required data present) and structure. However, the scope of the present disclosure should not be so limited. Additionally, The SDA2 database 50B stores all SDA2 related information and entries, including maintenance actions, maintenance service logs and maintenance releases. In various embodiments, the SDA2 database 50B also maintains a list of transactions representing all actions against the SDA2 module 42B. Also, in various embodiments, entries in the SDA2 database 50B may not be altered or deleted, only new entries identifying the action taken are stored and related to previous entries.

The CMF1 module 58A and the CMF2 module 58B are cooperating portions of a comprehensive communications management function (CMF) 58 that are hosted at separate locations within the RTESV system 10, but are cooperatively executable to perform all the functions of the CMF 58, as implemented by the RTESV system 10. Accordingly, the CMF1 module 58A and the CMF2 module 58B are comprehensively referred to herein as the communications management function (CMF) 58.

The comprehensive communication management function (CMF) 58 is the primary messaging component in the RTESV system 10. Particularly, the CMF 58 is responsible for communicating messages, i.e., sending and receiving data., information, correspondence, reports, etc., between the one or more OCSs 14 and the one or more CCSs 20. Each of the SDA1 module 42A and the SDA2 module 42B directly interfaces with the respective CMF1 and CMF2 modules 58A and 58B for messaging functions. Among its many functions, the CMF 58 abstracts data link selections from each of the SDA1 and SDA2 modules 42 and 42B. Any encoding or segmentation required to send messages between the OCS(s) 14 and the CCS(s) 20, via a particular data link, is accomplished by the CMF 58. Generally, messages will either be encrypted or an encrypted data link will be used when transmitting messages between the OCS(s) 14 and the CCS(s) 20. In various embodiments, upon receiving a message, the respective CMF1 or CMF2 module 58A or 58B checks the integrity of the message by performing two 16-bit CRC checks. The first check is against the respective CMF1 or CMF2 module 58A or 58B header and the second check is against the body of the message. If either check fails, a failure message (NACK) is returned to the sending SDA1 or SDA2 module 42A or 42B.

In accordance with various embodiments, the OCS 14 further includes an OCS signature generator module 62 and an OCS cryptographic functions module 66. The OCS signature generator module 62 interfaces with, and is utilized by, the SDA1 module 42A to generate electronic signatures when a user of the OCS 14 evokes the SDA application 42 to perform a specific action, operation or procedure that requires the user to apply an electronic signature specific to the user. More particularly, in various embodiments, the purpose of the OCS signature generator module 62 is to electronically sign entries made utilizing the SDA1 module 42A. As described in detail below, when making entries into the SDA1 module 42A, the author, or user, will provide user account information such as first and last name, a personnel identification number, and personal identification number (PIN). The user can provide the user account information in any suitable manner. For example, the user can provide the user account information by directly entering the user account information using a user interface such as a keyboard, or the user could enter the user account information using a badge reader or USB portable memory device, i.e., a thumb drive, having the user's account information stored thereon. As used herein, the phrase personal identification number and the acronym PIN will be understood to mean an alphanumeric string known to the user.

When the SDA1 module 42A sends the entry and author, or user, information requiring the electronic signature to the OCS signature generator module 62, the OCS signature generator module 62 interfaces with the OCS cryptographic functions module 66 to create a formatted string, e.g., an XML string according to the W3C XML signature standard, that is interpretable by the CMF1 module 58A, and returns the formatted string to the SDA1 module 42A. In various embodiments, the OCS cryptographic functions module 66 contains algorithms for computing a cryptographic hash, signing the hash, and retrieving a hardware electronic certificate. In various embodiments, the hardware electronic certificate includes a dynamic certificate created by an intermediate certificate authority (not shown) issued by the particular business enterprise implementing the RTESV system 10.

The dynamic certificate contains an identification number of the mobile system 18 on which the OCS 14 resides (e.g., an airplane tail number) and identifies the source hardware (e.g., a serial number of the particular OCS 14). The benefit of this private/public key is that it is created and stored locally, i.e., onboard the respective mobile system 18, and uniquely identifies the OCS 14. The dynamic certificate is used as part of the signature captured for an entry made utilizing the SDA1 module 42A as the means to ensure the integrity of the entry during transmission to the CCS 20. The OCS 14 additionally includes a signature validator module 68 that checks the dynamic certificate against the intermediate certificate authority to verify that the intermediate certificate authority has not expired or been revoked. The OCS signature validator module 68 additionally checks the user account information to verify that the user signing the entry is authorized to do so, as described in detail below.

Furthermore, in various embodiments, the CCS 20 includes a CCS signature generator module 74, a CCS cryptographic functions module 78 and a CCS signature validator module 80. The CCS signature generator module 74 interfaces with, and is utilized by, the SDA2 module 42B to generate electronic signatures when a user of the CCS 20 evokes the SDA2 application 42 to perform a specific action, operation or procedure that requires the user to apply an electronic signature specific to the user. More particularly, in various embodiments, the purpose of the CCS signature generator module 74 is to electronically sign entries made utilizing the SDA2 module 42B. When making entries into the SDA2 module 42B, the author, or user, will provide user account information such as first and last name, a personnel identification number, and personal identification number (PIN), i.e., user specific information. As described above, the user can provide the user account information in any suitable manner, for example, using a user interface, using a badge reader or using a USB portable memory device.

When the SDA2 module 42B sends the entry and author, or user, information requiring the electronic signature to the OCS signature generator module 74, the CCS signature generator module 74 interfaces with the CCS cryptographic functions module 78 to create a formatted string, e.g., an XML string according to the W3C XML signature standard, that is interpretable by the CMF2 module 58B, and returns the formatted string to the SDA2 module 42B. In various embodiments, the CCS cryptographic functions module 78 contains algorithms for computing a cryptographic hash, signing the hash, and retrieving a hardware electronic certificate. In various embodiments, the hardware electronic certificate includes a dynamic certificate created by an intermediate certificate authority (not shown) issued by the particular business enterprise implementing the RTESV system 10.

In accordance with various embodiments, the OCS 14 further includes a mobile user account management (MUAM) module 82 that interfaces with the OCS signature validator module 68 to validate the electronic signatures of SDA1 module 42A entries in real-time, as in detail below. That is, the electronic signatures of SDA1 module 42A entries, are approximately instantaneously validated, i.e., in a non-temporally delayed fashion, upon the completion of electronically signing the data, information or function. In various embodiments, the MUAM module 82 includes one or more MUAM application functions 86, a MUAM message processing application 90 and a MUAM user database 94. The MUAM application functions 86 include software applications and algorithms utilized during execution of the MUAM module 82.

Generally, the MUAM message processing application 90 interfaces with the MUAM application functions 86 and the OCS CMF1 module 58. The MUAM message processing application 90 processes messages, data and information communicated between the CMF1 module 58A and the MUAM application functions 86. Specifically, messages sent and received through the CMF1 module 58A are processed at the application-level via the MUAM message processing application 90. When sending a message from the MUAM module 82, the MUAM message processing application 90 generates a CMF1-compliant message. When receiving a message from the SDA1 or the SDA2 module 42A or 42B, the MUAM message processing application 90 extracts the data and sends it to the MUAM application functions 86 for a transaction against the MUAM database 94, as described below.

Furthermore, in various embodiments, the CCS 20 includes a ground mobile user account management (GMUAM) module 96 that communicates with the MUAM module 82, via the CMF2 and CMF1 modules 58B and 58A to update and maintain the MUAM user database 94 up-to-date user account information. In various embodiments, the GMUAM module 96 includes one or more GMUAM application functions 98, a GMUAM message processing application 102 and a GMUAM user database 106. The GMUAM application functions 98 include software applications and algorithms utilized during execution of the GMUAM module 96. Generally, the GMUAM message processing application 102 interfaces with the GMUAM application functions 98. As described below, the GMUAM user database 106 is utilized to store all up-to-date user account information that is accessed and transmitted to the MUAM module 82 to update and maintain the MUAM user database 94 with up-to-date user account information.

In various embodiments the GMUAM message processing application 102 processes user account information communicated between the GMUAM 96 and an enterprise user account management (EUAM) system 114, via a user update service module 118, as described below. Generally, the EUAM system 114 is maintained and operated by the business enterprise to maintain an up-to-date user account database 120 having stored thereon user account information, and potentially digital certificates, for each person authorized to electronically sign data, information, forms, records, reports or functions generated using the SDA1 and SDA2 modules 42A and 42B. Generally, the EUAM system 114 includes one or more EUAM application functions 122, an EUAM message processing application 126 and the EUAM user database 120. The EUAM application functions 122 include software applications and algorithms utilized during execution of the EUAM system 114.

The EUAM user database 120 is utilized to store all up-to-date user account information for each person authorized by the respective business enterprise to electronically sign data, information, forms, records, reports or functions generated using the SDA1 and SDA2 modules 42A and 42B. The user account information, and potentially digital certificates, stored on the EUAM user database are accessed and transmitted to the GMUAM user database 106 to update and maintain the GMUAM user database 106 with up-to-date user account information. The up-to-date user account information, and in various embodiments, the digital certificates, are asynchronously automatically transmitted to the GMUAM module 96 and stored in the GMUAM user database 106, via the user update service module 118. Generally, the EUAM message processing application 126 interfaces with the EUAM application functions 122 and the user update services module 118. The EUAM message processing application 126 processes messages and user account data and information between the EUAM applications functions 122 and the GMUAM module 96, via the user update service module 118. Specifically, messages sent and received through the user update service module 118 are processed at the application-level via the EUAM message processing application 126.

In various other embodiments, the GMUAM user database 106 is manually updated with the user account information, and possibly digital certificates, utilizing an enterprise user interface 130. Utilizing the enterprise user interface 130, personnel of the business enterprise can manually input user account information, and potentially digital certificates, to the GMUAM user database 106, thereby updating and maintaining the GMUAM user database 106 with up-to-date user account information.

Referring now to FIGS. 1 and 2, operation of the RTESV system 10 will now be described, in accordance with various embodiments. As described above, in various embodiments, the RTESV system 10 includes the EUAM system 114 and the user service update module 118 to automatically update the GMUAM user database 106, thereby ensuring that user account information for all authorized users that is stored in the GMUAM user database 106 is up-to-date. Alternatively, the user account information stored in the GMUAM user database 106 can be manually updated using the enterprise user interface 130.

In the various implementations utilizing the EUAM system 114, the EUAM user database 120 is constantly updated by the respective business enterprise to maintain an up-to-date listing of the user account information for all users authorized to electronically sign entries generated using the SDA 42. On a periodic basis, e.g., every time the EUAM system 114 establishes a communications link with the GMUAM module 96 via the user update service, the EUAM application functions retrieve the user account information from the EUAM user database 120. Then, utilizing the EUAM message processing application 126 the user account information is passed to the user update service module 118. In various embodiments, only updated, or new, user account information is retrieved from the EUAM user database 120 and passed to the user update service module 118. The user update service module 118 propagates the retrieved user account information to the GMUAM application functions 98 via the GMUAM message processing application 102. In turn, the GMUAM application functions 98 store the received user account information in the GMUAM user database 106, thereby automatically updating the GMUAM user database 106. As described above, alternatively, the GMUAM user database 106 can be manually updated with new, or updated, user account information via the enterprise user interface 130.

Once the GMUAM user database 106 is updated, the GMUAM application functions 98 retrieves the user account information from the GMUAM user database 106 and transmits the retrieved user account information to the MUAM module 82 via the CMF2 and CMF1 modules 58B and 58A. In various embodiments, this propagation, or transfer, of user account information from the GMUAM user database 106 to the MUAM module 82 occurs periodically over an asynchronous communications link between the OCS 14 and the CCS 20, specifically between the CMF1 58A and the CMF2 58B. In various other embodiments, the propagation, or transfer, of user account information from the GMUAM user database 106 to the MUAM module 82 occurs over a substantially constant communications link between the OCS 14 and the CCS 20, specifically between the CMF1 58A and the CMF2 58B.

It should be understood that although the updating transfer of user account data from the GMUAM user database 106 to the MUAM module 82 has been described in terms of a single CCS and a single OSC, such updating transfers can be made from one or more CCSs 20 to one or more targeted OCSs 14 via communication links between the respective CCSs 20 and the targeted OCSs 14. In such instances, the GMUAM user databases 106 of the respective CCSs 20 can be updated using either the EUAM system 114 or various enterprise user interfaces 130, in the same manner as described above.

Once the CMF1 58A has received the user account information, the CMF1 58A interfaces with the MUAM message processing application 90 to pass the user account information to the MUAM application functions 86. The MUAM applications functions 86 then stores the received user account information in the MUAM user database 94, thereby updating the MUAM user database 94 with up-to-date user account information for all users authorized to electronically sign entries generated using the SDA1 module 42A.

In various embodiments, the updating of the MUAM user database 94 is performed as a non-part-number update, e.g., as non-loadable software. That is, the transfer of user account data from the GMUAM user database 106 to the MUAM user database 94 is performed by merely transmitting the user account information over the communications link, similar to an E-mail message. The user account information transferred is not configured as a software loadable file, but rather as a data string, or data packets of information transmitted over the communications link.

Additionally, in various embodiments, if errors occur in the transfer of the user account information from the GMUAM user database 106 to the MUAM user database 94, for example, if the CCS 20 to OCS 14 transmission fails, the GMUAM application functions 98 interfaces with the update failure module 110. The update failure module 110 then generates a failure notification message informing appropriate personnel, e.g., a system administrator, that updating of the MUAM user database 94 failed or was incomplete so that appropriate action can be taken, e.g., reattempt the update.

Updating the MUAM user database 94 with up-to-date user information, as described above, allows the OCS 14 to perform real-time validation of entries generated using the SDA1 42A and electronically signed using the signature generator and cryptographic functions modules 62 and 66. The real-time validation of electronically signed entries will now be described. When a user evokes the SDA1 module 42A to generate an entry, e.g., complete an electronic report form, the user creates the entry and provides user account information specific to the author of the entry, as described above. The SDA1 application functions 46A then store the entry in the SDA1 database 50A and request the signature generator and cryptographic functions modules 62 and 66 to generate an electronic signature using the user account information provided by the author of the entry.

Once the electronic signature is generated, the signature generator module 62 passes the generated electronic signature to the signature validator module 68 to verify that the signature is valid. More particularly, the signature validator module 68 verifies that the information entered by the author signing the entry, e.g., their user name, their personnel ID, their PIN number, is valid. To validate the signature, the signature validator module 68 interfaces with the MUAM application functions 86 to access the MUAM user database 94 that has been updated as described above. More specifically, the signature validator module 68 accesses the MUAM user database 94 to compare the user account information provided by the author of the entry and used to generate the electronic signature of the entry, against the user account information stored in the updated MUAM user database 94. If the user account information used to generate the electronic signature matches user account information stored in the MUAM user database 94, the signature is validated and the signature validator module 68 sends a response back to the SDA1 application functions 46A indicating that the user information provided and used to generate the signature is valid. The SDA1 application functions 46A would then pass the entry and electronic signature to the CMF1 58A, via the SDA1 message processing application 54A. The CMF1 58A, in turn, would communicate the electronically signed entry to the SDA2 module 42B, via the CMF2 module 58A, where the message would be deconstructed and stored in the SDA2 database 50B.

If the user account information used to generate the electronic signature does not match user account information stored in the MUAM user database 94, the signature is determined to be invalidated and the signature validator module 68 sends a response back to the SDA1 application functions 46A indicating that the user information provided and used to generate the signature is not valid. Consequently, the SDA1 application functions 46A would generate a 'signature failure' notification for appropriate personnel of the OCS 14, e.g., the author of the entry could be directed to re-enter their user account information or crew of a mobile platform hosting the OCS 14 could be notified that an unauthorized entry was attempted.

Those skilled in the art can now appreciate from the foregoing description that the broad teachings of the present disclosure can be implemented in a variety of forms. Therefore, while the present disclosure has been described in connection with particular examples thereof, the true scope of the present disclosure should not be so limited since other modifications will become apparent to the skilled practitioner upon a study of the drawings, specification and following claims.

What is claimed is:

1. A real-time electronic signature validation (RTESV) system, said system comprising:
    at least one stationary central computer system (CCS) including a ground mobile user account management (GMUAM) module, the GMUAM module comprising a GMUAM user database that is updatable by an enterprise user system to have stored thereon up-to-date authorized user account information; and
    at least one onboard computer system (OCS) hosted by at least one mobile system, where the at least one mobile system is located on a mobile vehicle, each OCS including:
        a mobile user account management (MUAM) module adapted to communicate with the GMUAM module, the MUAM module comprising a MUAM user database that is updatable by the GMUAM to have stored thereon the up-to-date authorized user account information stored on the GMUAM database;

a subsystem of the OCS that receives an entry made by a user using the OCS and that generates a dynamic certificate that includes:

a first identifier which is uniquely associated with the OCS from which the entry was created; and and a second identifier which identifies the mobile vehicle that the OCS is located on;

a signature validator module in communication with the subsystem, and further being communicatively connected to the MUAM module to access the MUAM database and verify whether user account information included in an electronic signature initiated by a secure data application (SDA) hosted by the OCS is authorized user account information.

2. The system of claim 1, wherein the enterprise user system comprises a stand alone computer based enterprise user interface for manually updating the GMUAM user database with the up-to-date authorized user account information.

3. The system of claim 1, wherein the enterprise user system comprises an enterprise user account management (EUAM) system for automatically updating the GMUAM user database with the up-to-date authorized user account information.

4. The system of claim 3, wherein the RTESV system further comprises a user update service module for propagating the up-to-date authorized user account information from the EUAM to the GMAUM module.

5. The system of claim 1, wherein the GMUAM further comprises an update failure module for generating a failure notification message when an attempt to update the MUAM user database using the up-to-date authorized user account information stored on the GMUAM database fails.

6. A method for real-time validation of an electronic signature generated onboard a mobile vehicle, said method comprising:

receiving an entry made by an individual using an onboard computer system (OCS) located on the mobile vehicle, and generating an electronic signature for the entry, where the electronic signature includes a dynamic certificate, the dynamic certificate including a first identifier which is uniquely associated with the OCS from which the entry was created, and a second identifier which identifies the mobile vehicle on which the OCS is being used;

maintaining a ground mobile user account management (GMUAM) module user database to have up-to-date authorized user account information stored thereon, the GMUAM hosted by a stationary central computer system (CCS);

transferring the up-to-date authorized user account information stored on the GMUAM user database to a mobile user account management (MUAM) module user database to update the MUAM user data base with up-to-date authorized user account information stored on the GMUAM, the MUAM module included in the OCS;

after generating the electronic signature, substantially immediately evoking a signature validator module communicatively connected to the MUAM module to access the MUAM database and to verify, substantially immediately, whether user account information included in the electronic signature, initiated by a secure data application (SDA), is authorized user account information, the SDA and the signature validator module being hosted by the OCS.

7. The method of claim 6, wherein maintaining the GMUAM user database comprises transmitting the up-to-date authorized user account information from an enterprise user system to the GMUAM database to update the GMUAM user database with the up-to-date authorized user account information.

8. The method of claim 7, wherein the enterprise user system comprises a stand alone computer based enterprise user interface and transmitting the up-to-date authorized user account information from an enterprise user system comprises manually updating the GMUAM user database with the up-to-date authorized user account information utilizing the stand alone computer based enterprise user interface.

9. The method of claim 7, wherein the enterprise user system comprises an enterprise user account management (EUAM) system and transmitting the up-to-date authorized user account information from an enterprise user system comprises automatically updating the GMUAM user database with the up-to-date authorized user account information utilizing the EUAM system.

10. The method of claim 9, wherein transmitting the up-to-date authorized user account information from the EUAM comprises propagating the up-to-date authorized user account information from the EUAM to the GMUAM module via a user update service module communicatively connected to the EUAM and the GMUAM.

11. The method of claim 6, wherein transferring the up-to-date authorized user account information stored on the GMUAM user database to the MUAM comprises transmitting the up-to-date authorized user account information from the GMUAM to the MUAM as non-loadable data.

12. The method of claim 6, wherein transferring the up-to-date authorized user account information stored on the GMUAM user database to the MUAM comprises generating a failure notification message when an attempt to update the MUAM user database using the up-to-date authorized user account information stored on the GMUAM database fails.

13. The method of claim 6, wherein evoking the signature validator module to access the MUAM database and verify whether user account information included in the electronic signature is authorized user account information comprises comparing the user account information included in the electronic signature to the updated authorized user account information stored on the MUAM database.

14. A method for real-time validation of an electronically signature generated onboard a mobile vehicle, said method comprising:

receiving an entry made by an individual using an onboard computer system (OCS) of a mobile system located on the mobile vehicle, and generating an electronic signature for the entry, where the electronic signature includes a dynamic certificate, the dynamic certificate including:

a first identifier which is uniquely associated with the OCS from which the entry was created; and a second identifier which specifically identifies the mobile vehicle on which the OCS is being used;

transmitting up-to-date authorized user account information from an enterprise user system to ground mobile user account management (GMUAM) module user database to maintain the GMUAM module user database with up-to-date authorized user account information stored thereon, the GMUAM hosted by a stationary central computer system (CCS);

transferring the up-to-date authorized user account information stored on the GMUAM user database to a mobile user account management (MUAM) module user database to update the MUAM user data base with up-to-date authorized user account information stored on the GMUAM, the MUAM module included in the OCS hosted by the mobile system;

evoking a signature validator module in communication with the MUAM module to access the MUAM database and verify whether user account information included in an electronic signature initiated by a secure data application (SDA) is authorized user account information, the SDA and the signature validator module hosted by the OCS.

15. The method of claim 14, wherein the enterprise user system comprises a stand alone computer based enterprise user interface and transmitting the up-to-date authorized user account information from an enterprise user system comprises manually updating the GMUAM user database with the up-to-date authorized user account information utilizing the stand alone computer based enterprise user interface.

16. The method of claim 14, wherein the enterprise user system comprises an enterprise user account management (EUAM) system and transmitting the up-to-date authorized user account information from an enterprise user system comprises automatically updating the GMUAM user database with the up-to-date authorized user account information utilizing the EUAM system.

17. The method of claim 16, wherein transmitting the up-to-date authorized user account information from the EUAM comprises propagating the up-to-date authorized user account information from the EUAM to the GMUAM module via a user update service module communicatively connected to the EUAM and the GMUAM.

18. The method of claim 14, wherein transferring the up-to-date authorized user account information stored on the GMUAM user database to the MUAM comprises transmitting the up-to-date authorized user account information from the GMUAM to the MUAM as non-loadable data.

19. The method of claim 14, wherein transferring the up-to-date authorized user account information stored on the GMUAM user database to the MUAM comprises generating a failure notification message when an attempt to update the MUAM user database using the up-to-date authorized user account information stored on the GMUAM database fails.

20. The method of claim 14, wherein evoking the signature validator module to access the MUAM database and verify whether user account information included in the electronic signature is authorized user account information comprises comparing the user account information included in the electronic signature to the updated authorized user account information stored on the MUAM database.

* * * * *